United States Patent
Shibuya et al.

(10) Patent No.: US 8,976,261 B2
(45) Date of Patent: Mar. 10, 2015

(54) OBJECT RECOGNITION APPARATUS, OBJECT RECOGNITION METHOD AND OBJECT RECOGNITION PROGRAM

(71) Applicant: Olympus Imaging Corp., Shibuya-ku, Tokyo (JP)

(72) Inventors: Hiroyuki Shibuya, Hachioji (JP); Satoshi Hara, Hino (JP)

(73) Assignee: Olympus Imaging Corp., Tokyo (JP)

( * ) Notice: Subject to any disclaimer, the term of this patent is extended or adjusted under 35 U.S.C. 154(b) by 23 days.

(21) Appl. No.: 13/899,018

(22) Filed: May 21, 2013

(65) Prior Publication Data
US 2013/0314562 A1 Nov. 28, 2013

(30) Foreign Application Priority Data
May 24, 2012 (JP) ................. 2012-118778

(51) Int. Cl.
*H04N 5/228* (2006.01)
*H04N 5/232* (2006.01)
(52) U.S. Cl.
CPC ....... *H04N 5/23293* (2013.01); *H04N 5/23216* (2013.01); *H04N 5/23219* (2013.01); *H04N 5/23245* (2013.01)
USPC ................. 348/222.1; 348/208.14

(58) Field of Classification Search
USPC ............. 348/333.01–333.03, 333.05, 208.14, 348/222.1
See application file for complete search history.

(56) References Cited

U.S. PATENT DOCUMENTS

| | | | |
|---|---|---|---|
| 2003/0071908 A1* | 4/2003 | Sannoh et al. | 348/345 |
| 2006/0120564 A1* | 6/2006 | Imagawa et al. | 382/103 |
| 2012/0093365 A1* | 4/2012 | Aragane et al. | 382/103 |
| 2012/0262591 A1* | 10/2012 | Matsuyama | 348/208.14 |
| 2012/0307101 A1* | 12/2012 | Fukuya et al. | 348/222.1 |

FOREIGN PATENT DOCUMENTS

JP 2010-268019 11/2010

* cited by examiner

*Primary Examiner* — Sinh Tran
*Assistant Examiner* — Zhenzhen Wu
(74) *Attorney, Agent, or Firm* — John C. Pokotylo; Straub & Pokotylo

(57) ABSTRACT

There is a need for an object recognition apparatus for identifying multiple objects separately or collectively and a method therefor. An object recognition apparatus is configured to include: an image output section acquiring multiple object images and outputting an image; a detection section detecting the multiple object images in the image; a first identification section identifying the detected multiple object images; and a second identification section identifying the detected multiple object images collectively.

15 Claims, 15 Drawing Sheets

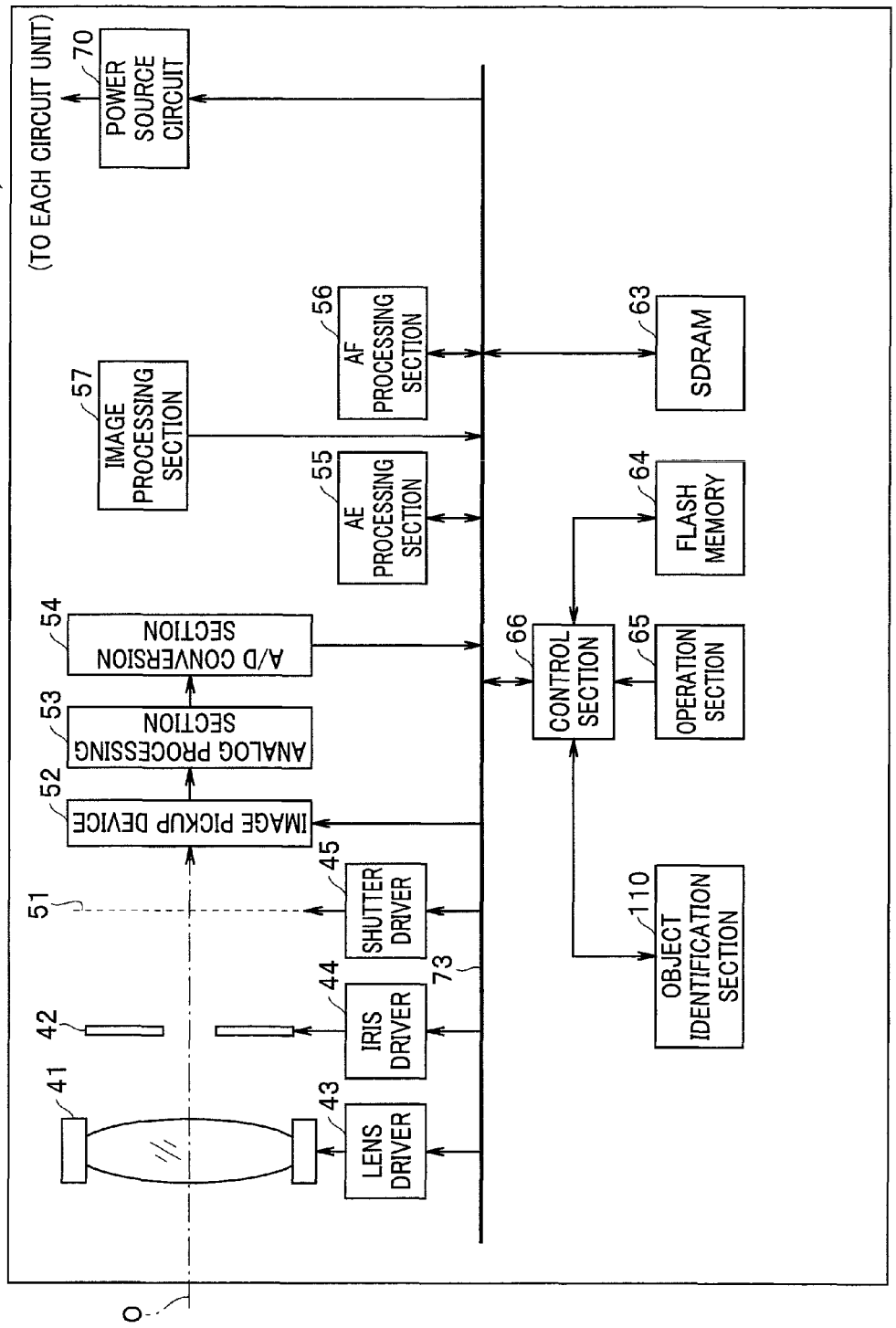

OBJECT RECOGNITION APPARATUS, OBJECT RECOGNITION METHOD AND OBJECT RECOGNITION PROGRAM

CROSS REFERENCE TO RELATED APPLICATION

This application claims the benefit of Japanese Application No. 2012-118778 filed in Japan on May 24, 2012, the contents of which are incorporated herein by this reference.

BACKGROUND OF THE INVENTION

1. Field of the Invention

The present invention relates to an object recognition apparatus.

2. Description of the Related Art

Recently, among motion picture recording apparatuses such as camcorders and digital cameras, a motion picture recording apparatus has been put to practical use in which so-called multi-recording is realized, for example, by being provided with multiple image processing engines so that, at the time of recording a motion picture using one motion picture recording apparatus, multiple motion pictures corresponding to multiple areas within a whole recording range can be simultaneously acquired and the different motion pictures can be simultaneously recorded.

For example, a recording apparatus disclosed by Japanese Patent Application Laid-Open Publication No. 2010-268019 is provided with two image acquisition means, image acquisition means for acquiring a first image (a whole) including a second image (a partial area) and image acquisition means for acquiring the second image different from the first image almost simultaneously acquisition of the first image, to perform processing for combining the second image with the first image and record a composite still image obtained as a result.

SUMMARY OF THE INVENTION

An object recognition apparatus of an aspect of the present invention includes: an image output section acquiring multiple object images and outputting an image; a detection section detecting the multiple object images in the image; a first identification section identifying the detected multiple object images; and a second identification section identifying the detected multiple object images collectively.

An object recognition method of an aspect of the present invention includes the steps of: acquiring multiple object images and outputting an image; detecting the multiple object images in the image; identifying the detected multiple object images; and identifying the detected multiple object images collectively.

The benefit of the present invention will be more apparent from detailed description below.

BRIEF DESCRIPTION OF THE DRAWINGS

FIG. 19 is a configuration diagram of an object monitoring apparatus of second and third embodiments.

DETAILED DESCRIPTION OF THE PREFERRED EMBODIMENTS

First Embodiment

Figure 1A:
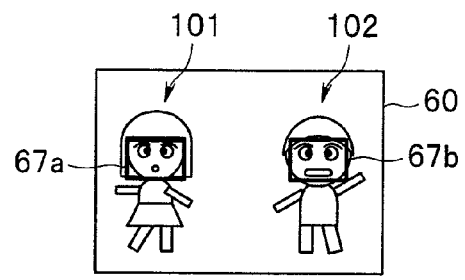
FIGS. 1A to 1F are diagrams illustrating a concept of a first embodiment.

The present invention will be described below by a first embodiment shown in diagrams. The present embodiment illustrates a case of applying the present invention to a motion picture recording apparatus, one of object recognition apparatuses. The motion picture recording apparatus of the present embodiment performs photoelectric conversion of an optical image formed by an optical lens, using an image pickup device, and converts an image signal obtained thereby to digital image data indicating a motion picture. The digital image data generated in this way is recorded to a recording medium. Then, the motion picture is reproduced and displayed on a display section on the basis of the digital image data recorded in the recording medium. The motion picture recording apparatus is configured as described above and is also configured being provided with multiple image processing engines so that multiple digital image data are acquired by a predetermined operation.

In each drawing used in description below, there may be a case that each component is shown with a different scale so that each component can be of a recognizable size on the drawing. Therefore, as for the number of components, the shapes of the components, the size ratio of the components and relative positional relationship among the components shown in the drawings, the present invention is not limited to forms shown in the diagrams.

Figure 2:
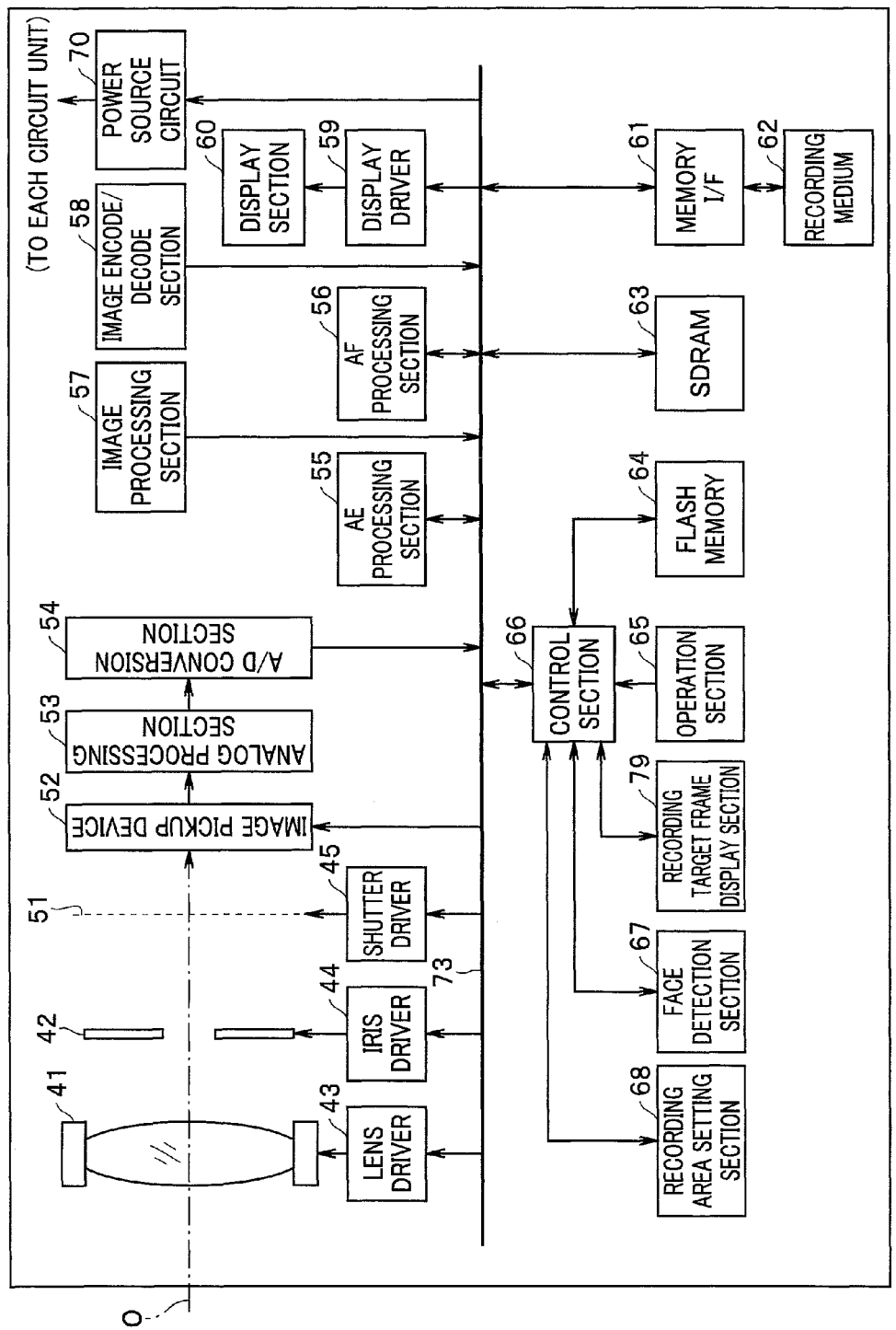
FIG. 2 is a configuration diagram showing an outline of an internal configuration of a motion picture recording apparatus of the first embodiment.
Figure 3:
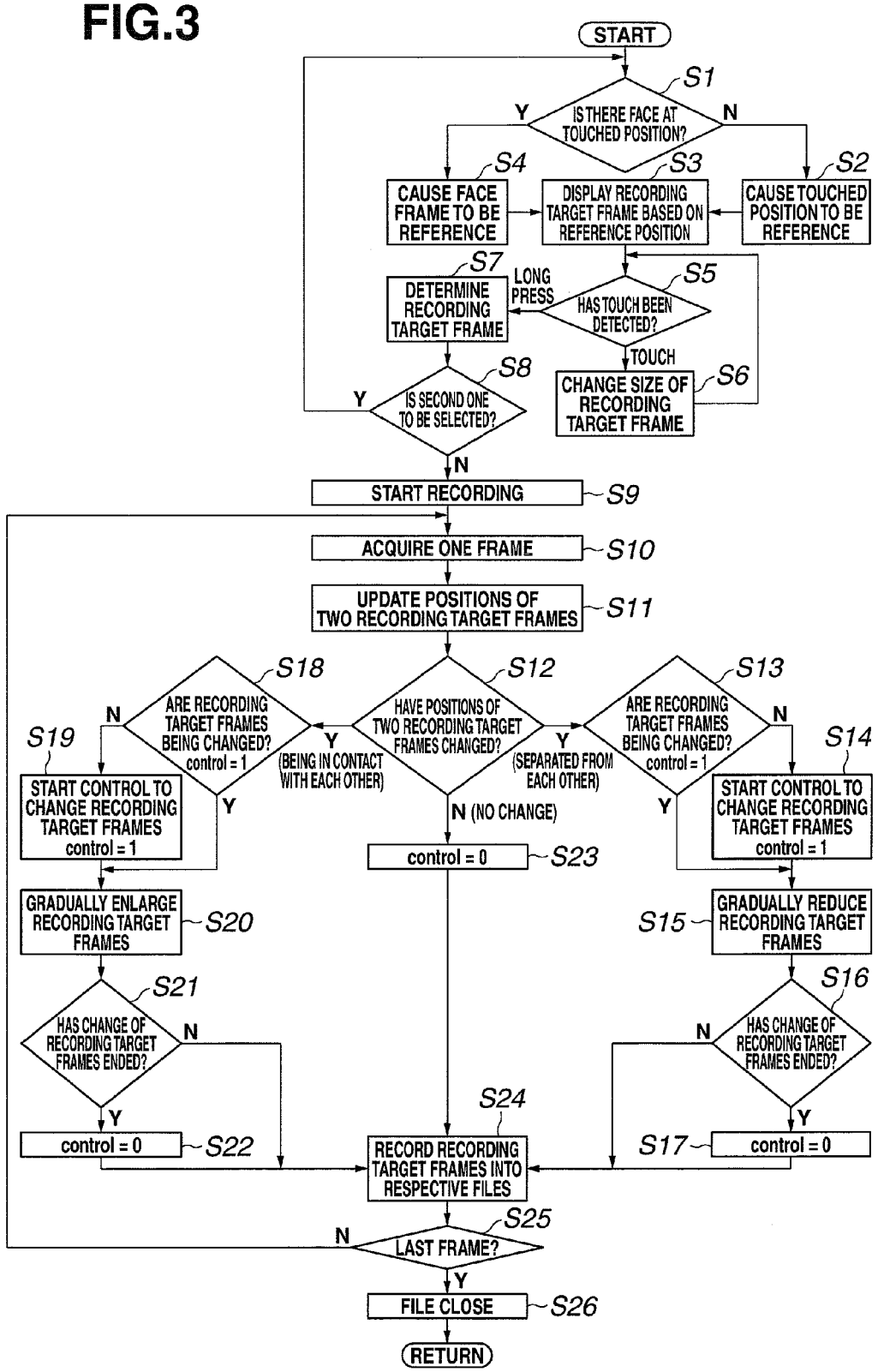
FIG. 3 is a flowchart showing a process at the time of recording operation of the motion picture recording apparatus of the first embodiment.

FIGS. 1A to 1F are diagrams illustrating a concept of the present embodiment. FIG. 2 is a block configuration diagram showing an outline of an internal configuration of the motion picture recording apparatus of the present embodiment. FIGS. 3 to 18 are diagrams illustrating operations in the motion picture recording apparatus of the present embodiment. Among these, FIG. 3 is a flowchart showing a process at the time of the motion picture recording apparatus of the present embodiment performing motion picture recording.

Figure 6A:
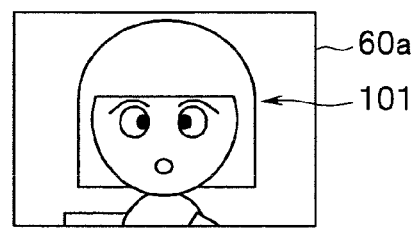
FIGS. 6A to 6F are diagrams showing change of a motion picture with a first object as a main object recorded at each of timings of FIGS. 5A to 5F.
Figure 6B:
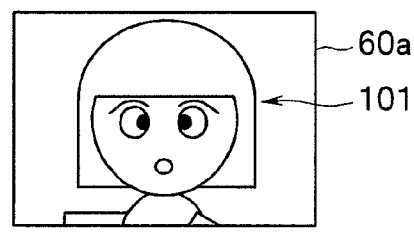
Figure 6C:
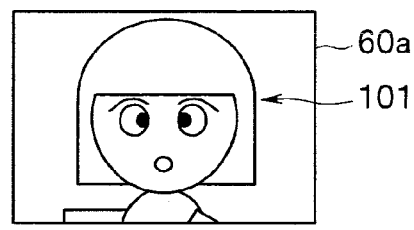
Figure 6D:
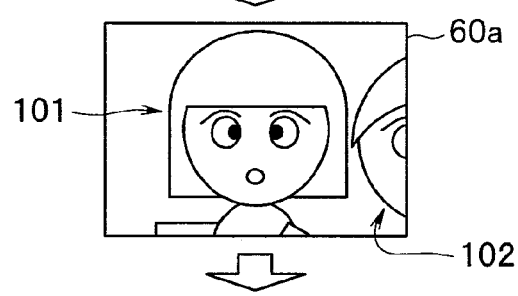
Figure 6E:
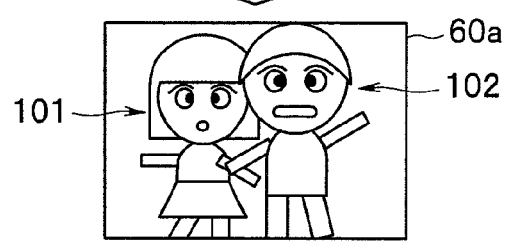
Figure 6F:
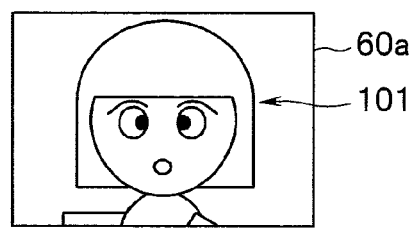
Figure 7A:
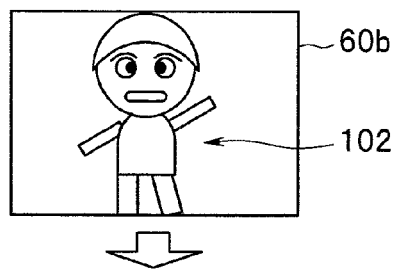
FIGS. 7A to 7F are diagrams showing change of a motion picture with a second object as a main object recorded at each of timings of FIGS. 5A to 5F.
Figure 7B:
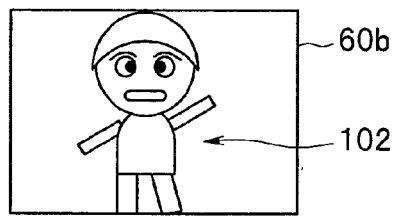
Figure 7C:
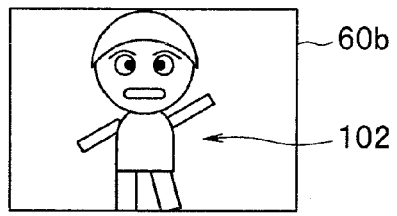
Figure 8:
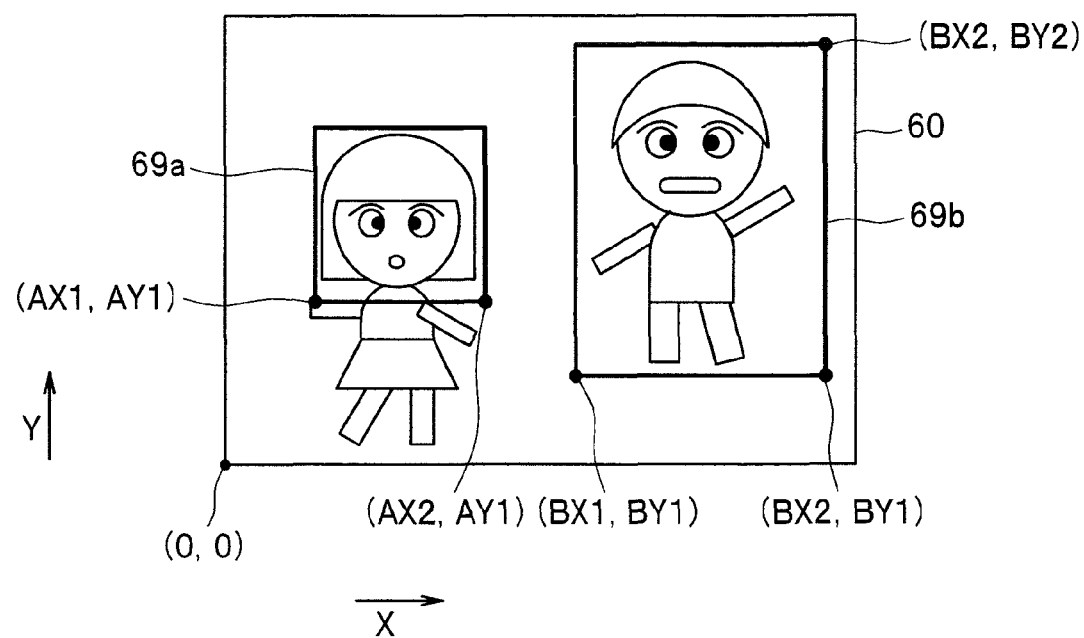
FIG. 8 is a diagram showing coordinates of an image displayed on a display section of the first embodiment, which are estimated on a screen.
Figure 9:
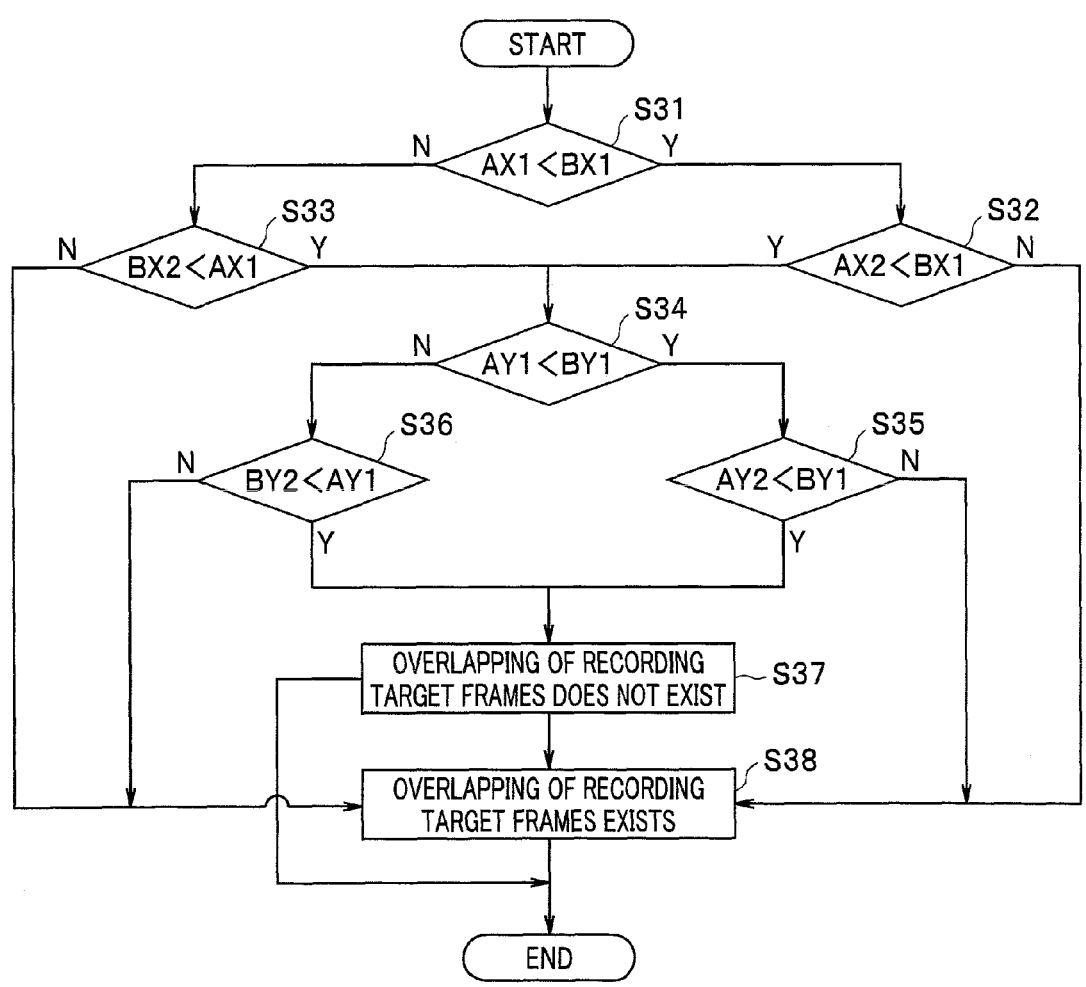
FIG. 9 is a flowchart showing "overlap-between-recording-target-frames judgment" of the first embodiment.
Figure 10:
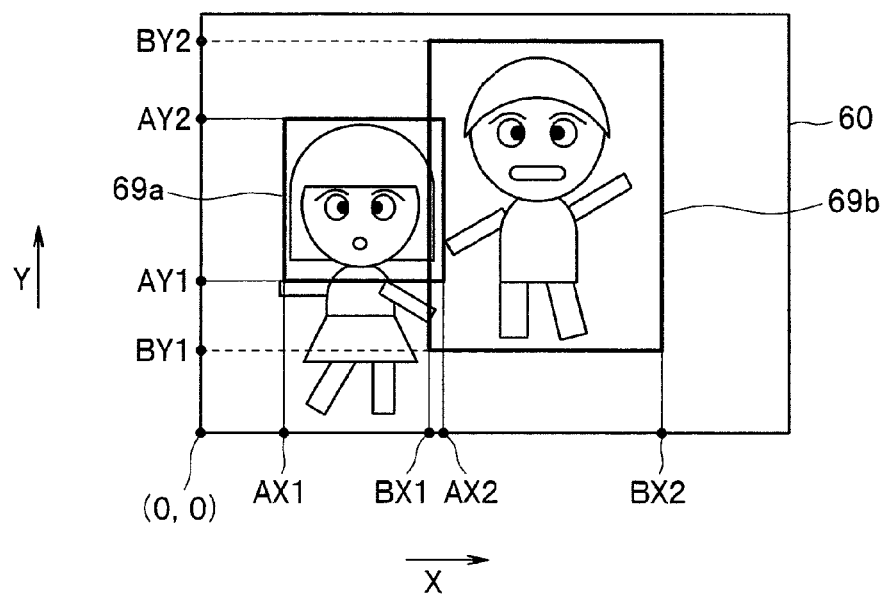
FIG. 10 is a diagram showing coordinates of multiple recording target frames displayed on the display section of the first embodiment.
Figure 11:
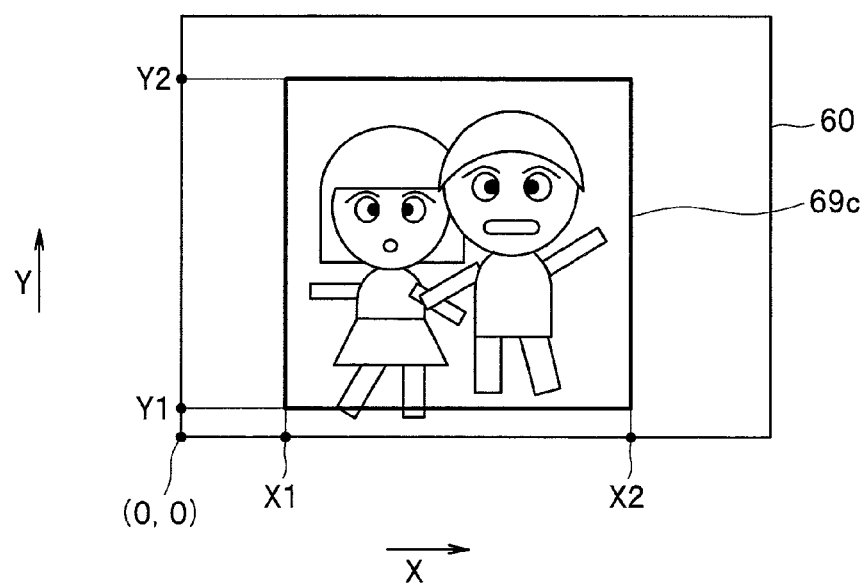
FIG. 11 is a diagram showing coordinates of a composite recording target frame displayed on the display section of the first embodiment.

FIGS. 4A to 4E are diagrams showing an outline of, in the motion picture recording apparatus of the present embodiment, performing a touch operation to display recording target frames and setting a recording mode. FIGS. 5A to 5F are diagrams corresponding to the process of FIG. 3 and showing change of recording target frames at the time of recording a motion picture. FIGS. 6A to 6F and FIGS. 7A to 7F are diagrams showing change of a motion picture recorded at each of timings of FIGS. 5A to 5F. FIGS. 6A to 6F show a motion picture with a first object as a main object, and FIGS. 7A to 7F show a motion picture with a second object as a main object. FIG. 8 shows coordinates on the screen of the display section of the motion picture recording apparatus of the present embodiment. FIG. 9 is a flowchart showing "overlap-between-recording-target-frames judgment" at the time of judging overlapping between two recording target frames on the screen of the motion picture recording apparatus of the present embodiment. FIG. 10 is a diagram showing coordinates of multiple recording target frames displayed on the display section of the motion picture recording apparatus of the present embodiment. FIG. 11 is a diagram showing coordinates of a composite recording target frame displayed on the display section of the motion picture recording apparatus of the present embodiment.

Figure 12:
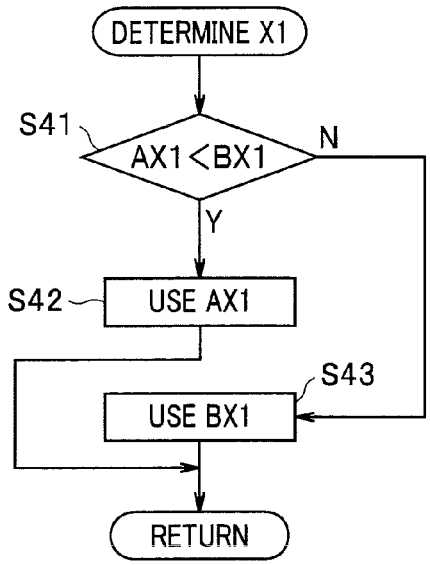
FIG. 12 is a flowchart showing judgment of X1 of the composite recording target frame of the first embodiment.
Figure 13:
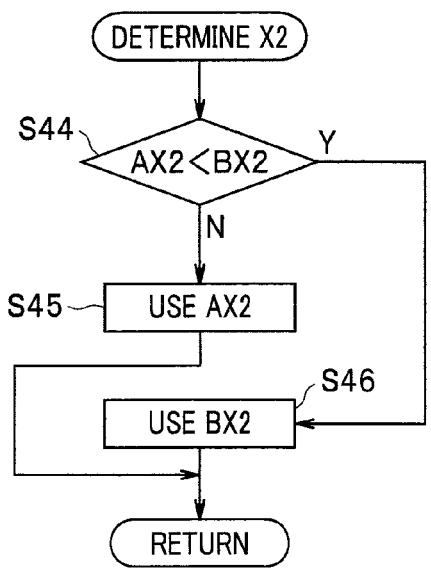
FIG. 13 is a flowchart showing judgment of X2 of the composite recording target frame of the first embodiment.
Figure 14:
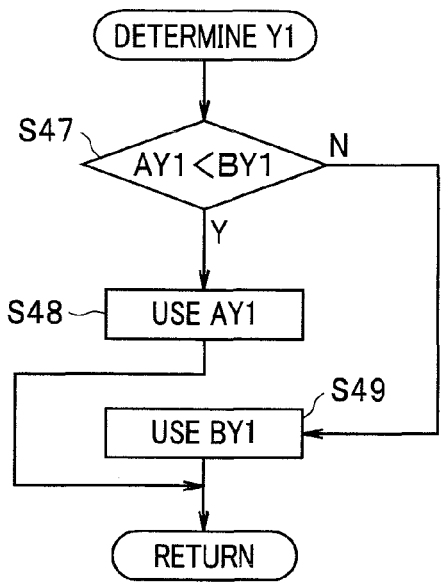
FIG. 14 is a flowchart showing judgment of Y1 of the composite recording target frame of the first embodiment.
Figure 17:
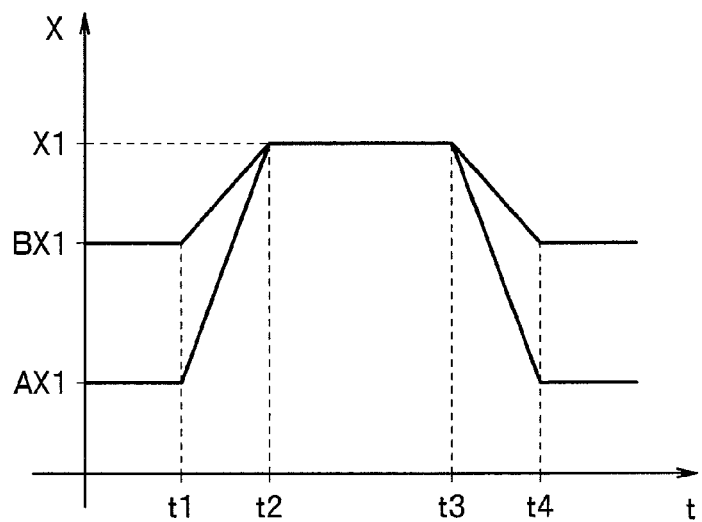
FIG. 17 is a diagram showing transition of points on an X axis at the time of enlarging and reducing the recording target frames of FIGS. 16A to 16D.
Figure 18:
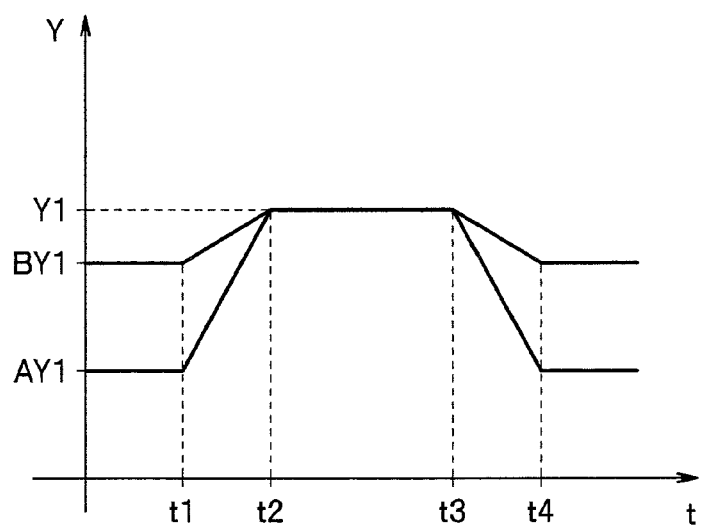
FIG. 18 is a diagram showing transition of points on a Y axis at the time of enlarging and reducing the recording target frames of FIGS. 16A to 16D.

FIGS. 12 to 14 are flowcharts showing "generation of the composite frames aim at objects to record movie" at the time of the generating the composite frames aim at objects to record movie being generated and displayed. FIGS. 12, 13, 14 and 15 show judgment of X1, X2, Y1 and Y2 of the composite recording target frame, respectively. FIGS. 16A to 16D are conceptual diagrams showing a state at the time of two recording target frames being changed into a composite recording target frame on the screen. FIGS. 17 and 18 are diagrams in which the state at the time of changing the sizes of the recording target frames in FIGS. 16A to 16D are graphed. FIGS. 17 and 18 show transition of points on an X axis and a Y axis, respectively, at the time of enlarging and reducing the recording target frames.

First, a concept of the present embodiment will be briefly described with the use of FIGS. 1A to 1F. In order to perform recording with multiple objects as recording targets using the motion picture recording apparatus of the present embodiment, a cameraman aims the motion picture recording apparatus at the desired recording targets. At this time, images shown in FIGS. 1A to 1F are displayed on the screen of a display section 60 of the motion picture recording apparatus. Here, reference numerals 101 and 102 indicate the multiple objects to be the recording targets. The objects are referred to as a first object 101 and a second object 102, respectively.

Reference numerals 67a and 67b shown in FIG. 1A are recording target frames, which are frames for identification to display the first object 101 and the second object 102 identifiably, which are first auxiliary images. A frame for identified the face which are automatically attached to face image areas detected by a general face detection function correspond to the recording target frames.

The recording target frames may be displayed in response to a result of selection of desired objects from an image displayed on the screen by operating a touch screen. In this case also, after the face detection frames detected by the face detection function are displayed, the face detection frames may be used as candidates for selection. The cameraman looks at the display showing the candidates and selects a desired object by a predetermined operation. Thereby, a recording target frame is displayed being overlapped on the selected object.

FIG. 1A shows a recording preparation state, a state immediately after recording target frames (67a and 67b) for multiple (two in the present embodiment) objects among recording targets are set. When the recording target frames are set as described above, each recording target frame follows movement of a corresponding object and continues to track focus on the object and, at the same time, detects a position of each object. Thus, the face detection function also functions as a position detection section.

Next, a recording mode for performing motion picture recording is set. Recording modes include:

a face close-up mode for recording an object's face as a main target;

a bust close-up mode for recording an object's upper body including the object's face; and a whole-body mode for recording the whole body of an object including the object's face.

In the bust close-up mode, a recording target frame the height of which is twice as long as the length of a detected face is set downward from the face with the face as a center. In the whole-body mode, a recording target frame the height of which is five times as long as the length of a detected face is set downward from the face with the face as a center. However, though, in both of the upper-body mode and the whole-body mode, a recording target frame corresponding to each of the modes described above is set with a face as a starting point, the size of the recording target frame is automatically adjusted in that case, for example, by cutting a part beyond the screen of the display section 60. This adjustment is performed by a recording area setting section 68 to be described later.

These recording modes can be arbitrarily selected by the cameraman. An operation for the selection is performed by operating an input device such as a touch screen. The recording target frame differs according to the respective recording modes. Thus, the recording target frame also functions as a frame to identify the recording mode for displaying a recording mode identifiably.

Figure 1B:
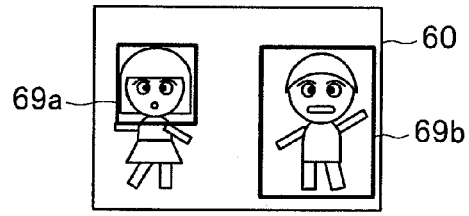

As shown in FIG. 1B, when the cameraman selects a recording mode, selected recording target frames 69a and 69b (first identification sections) are displayed, and each recording target frame includes each object image. The recording target frame 69a is based on a face detection frame 67a which includes the first object 101, and the recording target frame 69b is based on a face detection frame 67b which includes the second object 102. The recording target frames 69a and 69b also follow movement of the respective corresponding objects.

Figure 1C:
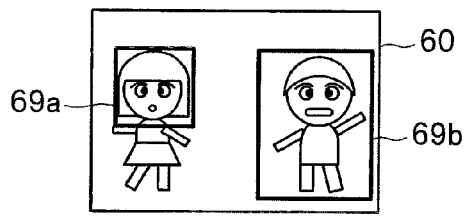

When the cameraman performs a release operation to start recording of a motion picture in this state, recording of multiple motion pictures corresponding to the recording target frames 69*a* and 69*b* starts (first images). As described above, the recording target frames 69*a* and 69*b* indicate main areas of the recording targets. Therefore, the actual motion pictures are recorded as motion pictures with a predetermined aspect ratio, such as 16:9 and 4:3, which include the recording target frames 69*a* and 69*b* as main areas. In addition to the multiple motion pictures with the respective objects as main objects, a whole image displayed on the screen may be simultaneously recorded as a motion picture. FIG. 1C shows a state at this time.

Figure 1D:
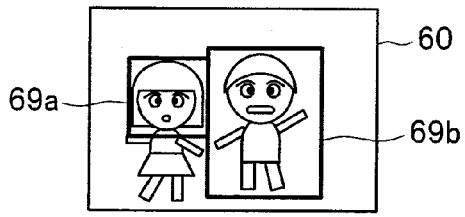

When motion picture recording is continued from the state of FIG. 1C, movement of the multiple objects 101 and 102 in the screen occurs. Then, as shown in FIG. 1D, when the objects 101 and 102 move in a direction of coming near to each other in the screen, the two recording target frames 69*a* and 69*b* overlap with each other by a predetermined amount or more.

Figure 1E:
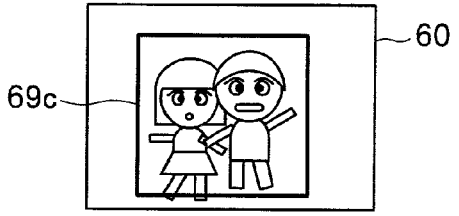
Figure 1F:
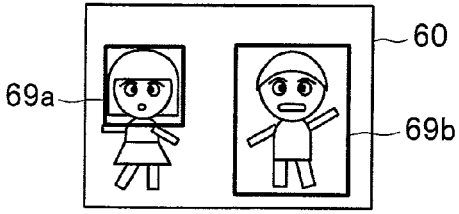

Then, as shown in FIG. 1E, the two recording target frames 69*a* and 69*b* are changed into one large recording target frame 69*c* (a second identification section). The new recording target frame 69*c* is a composite recording target frame generated on the basis of the two recording target frames 69*a* and 69*b* so that the two objects 101 and 102 to which the two recording target frames 69*a* and 69*b* correspond are included therein. The size of this composite recording target frame is set according to the sizes of the two recording target frames 69*a* and 69*b*. If the sizes of the two recording target frames 69*a* and 69*b* are different from each other, the composite recording target frame 69*c* (a second auxiliary image) is set according to the size of a larger recording target frame (in the present embodiment, the recording target frame 69*b*). Then, one motion picture (a second image) with the composite recording target frame 69*c* as a main area is continuously recorded in each of the above two motion pictures.

In this case also, data in the original two recording target frames 69*a* and 69*b* is held, and the respective corresponding objects are continuously followed though it is not displayed.

When motion picture recording is continued in the state of FIG. 1E, the objects 101 and 102 move in a direction of getting away from each other in the screen. Then, when the amount of overlapping between the two recording target frames 69*a* and 69*b* (being in a hidden state at this time) corresponding to the two objects 101 and 102, respectively, is a predetermined amount or less, the recording target frame 69*c* is changed into the two recording target frames 69*a* and 69*b* again, and recording of the multiple different motion pictures is continued.

Next, the outline of the internal configuration of the motion picture recording apparatus (hereinafter referred to as a camcorder 1) will be described below with the use of FIG. 2.

As shown in FIG. 2, the camcorder 1 of the present embodiment is configured by a recording optical system 41, an iris mechanical section 42, a lens driver 43, an iris driver 44, a shutter mechanical section 51, a shutter driver 45, an image pickup device 52, an analog processing section 53, an analog-digital conversion section (hereinafter referred to as an A/D conversion section) 54, an AE processing section 55, an AF processing section 56, an image processing section 57, an image encode/decode section 58, a display driver 59, the display section 60, a memory interface (hereinafter referred to as a memory IF) 61, a recording medium 62, an SDRAM 63, a flash memory 64, an operation section 65, a control section 66, a face detection section 67, the recording area setting section 68, a recording target frame display section 79, a power source circuit 70, a communication bus 73 and the like. Reference symbol O in FIG. 2 indicates an optical axis of the recording optical system 41.

The recording optical system 41 is a unit which transmits a luminous flux from an object to form an object image and forms the object image on a light receiving surface of the image pickup device 52. The recording optical system 41 is configured by multiple optical lenses arranged along the optical axis O, lens barrels supporting the multiple optical lenses, respectively, and the like. The recording optical system 41 is driven by the control section 66 via the lens driver 43. In FIG. 2, the multiple optical lenses, the lens barrels and the like of the recording optical system 41 are shown being simplified.

The lens driver 43 is a unit which causes at least a part of lens barrels supporting the optical lenses of the recording optical system 41 to move forward and backward in a direction along the optical axis O. The lens driver 43 is configured by a driving source such as an actuator, a driving mechanism or the like for transmitting driving power from the driving source, and an electric circuit or the like for controlling the driving source.

The iris mechanical section 42 is installed in the recording optical system 41, and it is a unit which adjusts a luminous flux transmitted through the recording optical system 41. The iris mechanical section 42 is driven by the control section 66 via the iris driver 44.

The iris driver 44 is configured by a driving source such as a stepping motor, a driving mechanism or the like for transmitting driving power from the driving source, and an electric circuit or the like for controlling the driving source.

The shutter mechanical section 51 is a unit which controls exposure time period of an object image formed on the light receiving surface of the image pickup device 52. The shutter mechanical section 51 is driven by the control section 66 via the shutter driver 45. The shutter driver 45 is a unit which controls the shutter mechanical section 51 under the control of the control section 66.

The image pickup device 52 is a photoelectric conversion element which, by performing photoelectric conversion of an object image formed on the light receiving surface, converts the object image to an analog image signal. A photoelectric conversion element, such as a CMOS and a CCD, is used as the image pickup device 52. The analog image signal generated by the image pickup device 52 is outputted to the analog processing section 53. Therefore, the image pickup device 52 is an image output section which acquires and outputs an image signal indicating multiple object images.

An image pickup section of the camcorder 1 is configured by the recording optical system 41, the iris mechanical section 42, the shutter mechanical section 51, the image pickup device 52 and the like described above.

The analog processing section 53 is a signal processing section which receives the analog image signal outputted from the image pickup device 52 and performs gain-up and the like to obtain desired brightness after reducing noise and then performing waveform shaping. The signal processed by the analog processing section 53 is outputted to the A/D conversion section 54.

The A/D conversion section 54 is a signal processing section which receives the analog image signal outputted from the analog processing section 53 and converts the analog image signal to digital image data. The digital image data outputted from the A/D conversion section 54 is sent to the SDRAM 63 via the communication bus 73 and temporarily stored there.

The AE processing section 55 is a data processing section which calculates luminance of an object on the basis of the digital image data and is also a light source detection section which detects a light source. As data handled by the AE processing section 55, that is, data for calculation of luminance of an object, output data from an exclusive photometry sensor provided for the camcorder 1 may be also used, in addition to the digital image data described above.

The AF processing section 56 is a data processing section which takes out a high-spatial-frequency-component signal from the digital image data and performs AF processing to acquire a focus value.

The image processing section 57 is a data processing section which performs various image processes for the digital image data. The digital image data for which the various processes have been performed by the image processing section 57 is temporarily stored in the SDRAM 63 again.

The image encode/decode section 58 is a data processing section which performs encoding of digital image data by a predetermined encoding method or decoding of encoded digital image data. If digital image data handled by the image encode/decode section 58 is still image data, encoding and decoding by a method conforming to the JPEG standard are performed. If digital image data handled by the image encode/decode section 58 is motion picture data, encoding and decoding by various methods conforming to the Motion-JPEG standard, the H.264 standard and the like are performed.

The display section 60 is configured by a display device in various forms, such as a liquid crystal display device, to display an image based on digital image data. The display section 60 is driven under the control of the control section 66 via the display driver 59. The display driver 59 is a unit which controls the display section 60 under the control of the control section 66.

The display section 60 receives digital image data immediately after a recording operation and performs image display as a recording result for a predetermined time period. Otherwise, the display section 60 performs reproduction display of a still image or a motion picture based on digital image data recorded in the recording medium 62 or performs live view display or the like.

In the case of performing image reproduction on the basis of digital image data recorded in the recording medium 62, the control section 66 reads out desired data from among digital image data recorded in the recording medium 62 and performs decoding via the image encode/decode section 58. The digital image data decoded by the image encode/decode section 58 is temporarily stored in the SDRAM 63. Then, the control section 66 reads out the decoded digital image data from the SDRAM 63 via the display driver 59, converts the digital image data to a video signal displayable with the use of the display section 60 and, after that, outputs the video signal to the display section 60. Thereby, a still image or a motion picture is reproduced and displayed on the display section 60.

The memory IF 61 is an interface which controls the recording medium 62 under the control of the control section 66 and performs reading of a digital image data file recorded in the recording medium 62 or recording of a digital image data file to the recording medium 62.

The recording medium 62 is a medium for recording a digital image data file and the like, and a card-shaped semiconductor memory to be detachably installed in the camcorder 1, a so-called memory card or the like, is used. The form of the recording medium 62 is not limited thereto. The recording medium 62 may be fixed to the camcorder 1, and various forms, such as an optical recording medium, a magnetic recording medium, an electronic recording medium, may be used in addition to the semiconductor memory. A recording section is configured by the memory IF 61 and the recording medium 62.

The SDRAM 63 is a storage section configured by a volatile memory which temporarily stores a variety of data such as digital image data generated by the A/D conversion section 54 and digital image data processed by the image processing section 57 and the image encode/decode section 58.

The flash memory 64 is a storage section configured by a nonvolatile memory in which various parameters required for operation of the camcorder 1, such as coefficients for white balance and a filter to pass the low spatial frequency, and a variety of information such as proprietary information (a product name and a manufacturer's serial number) identifying the camcorder 1 are stored in advance. Furthermore, various programs to be executed by the control section 66 are also stored in the flash memory 64 in advance. That is, the control section 66 reads and executes a program stored in the flash memory 64 at an appropriate timing. In that case, the control section 66 reads in various parameters required for various processes from the flash memory 64.

The operation section 65 is configured by multiple operation members and the like for performing various operations against the camcorder 1. When the cameraman operates a predetermined operation member of the operation section 65, a predetermined instruction signal occurs, and the instruction signal is transmitted to the control section 66. The control section 66 receives the instruction signal and executes various processes. In addition to operation members which operate in conjunction with mechanical switches such as a power source button, a release button, a reproduction button, a menu button, a motion picture button and a mode switching button, the operation section 65 also includes an operation member for input for sending an instruction to the control section 66, such as a touch screen.

The control section 66 is a control section which generally controls various processes of the camcorder 1. The control section 66 also creates a digital image data file by adding necessary header information and footer information to digital image data temporarily stored in the SDRAM 63 and records the created digital image data file to the recording medium 62 via the memory IF 61. The operation section 65, the flash memory 64 and the face detection section 67 are directly connected to the control section 66.

The face detection section 67 detects information about an object, such as a form and a size, of an image with predetermined characteristics included in a recorded image, that is, a face image of a person or a pet, with predetermined image analysis. The face detection section 67 has a function of, when the detected face image moves, following the movement, and realizes a function of, even if the face image once exits the screen, continuously following the movement when the face image enters the screen again. That is, the face detection section 67 is a detection function which detects an object image in a recorded image, and it also functions as an object detection section.

The recording target frame display section 79 causes a recording target frame in a predetermined form to be displayed in an area selected by the face detection section 67 or the touch screen of the operation section 65, being overlapped on the screen. Furthermore, the recording target frame display section 79 causes the recording target frame to follow a recording target in accordance with a detection result by the face detection section 67. The recording target frame display section 79 also has a function of causing a display frame for recording mode identification corresponding to a set recording mode to be displayed.

The recording area setting section 68 sets an image area for recording corresponding to a recording target frame displayed by the recording target frame display section 79.

The power source circuit 70 is configured by a power supply, such as a battery, and a circuit or the like controlling the power supply, and the power source circuit 70 appropriately supplies necessary power to each unit in the camcorder 1 under the control of the control section 66.

The communication bus 73 is a communication channel for sending a variety of data which has occurred inside the camcorder 1 to the units constituting the camcorder 1. The communication bus 73 is connected to the A/D conversion section 54, the AE processing section 55, the AF processing section 56, the image processing section 57, the image encode/decode section 58, the display driver 59, the memory IF 61, the SDRAM 63, the control section 66, the lens driver 43, the iris driver 44, the shutter driver 45 and the like.

As for the other components, components similar to those of a common motion picture recording apparatus are provided, and they are omitted in the drawings. Among the components shown in FIG. 2, those that are not directly related to the present invention are described only briefly.

An operation of the camcorder 1 of the present embodiment configured as described above will be described below. First, when the power source circuit 70 of the camcorder 1 is turned on, the camcorder 1 enters a recording preparation state. The cameraman aims the camcorder 1 in this state at desired multiple objects. Then, the cameraman holds the camcorder 1 in a manner that the desired multiple objects are included in the screen of the display section 60.

The cameraman performs an operation of selecting an object to be a recording target on the screen of the display section 60 to display a recording target frame (FIG. 1A). As described above, when the camcorder 1 in the recording preparation state is aimed at a desired object, a live view is displayed on the screen of the display section 60. Then, on the basis of digital image data acquired by the image pickup device 52, the face detection section 67 executes face detection at the same time.

When the multiple objects 101 and 102, which are recording targets, are displayed on the screen of the display section 60, face detection is performed for the multiple objects 101 and 102, and the face detection frames 67a and 67b are displayed on face areas of the objects 101 and 102, respectively. In the present embodiment, the face detection frames 67a and 67b are treated as recording target frames.

The cameraman selects the desired face detection frame 67b between the face detection frames 67a and 67b which are the multiple recording target frames. An operation performed at this time is a touch operation to the touch screen which constitutes a part of the operation section 65.

FIGS. 4A to 4E show an outline of, in the motion picture recording apparatus, performing the touch operation to display a recording target frame for performing motion picture recording and selecting a recording mode. FIGS. 4A to 4E show an operation performed in the case where, when performance of a touch operation, display of a recording target frame, setting of a mode have been already executed for one object 101, an operation is to be performed for the other object 102 next.

Figure 4A:
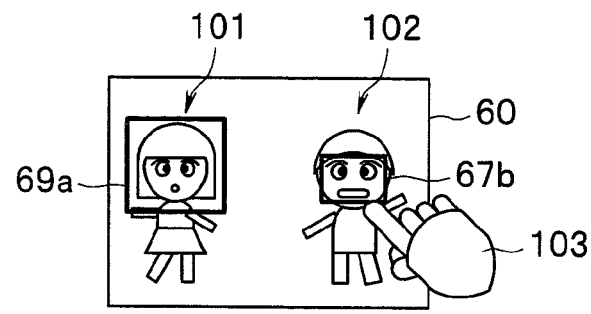
FIGS. 4A to 4E are diagrams showing an outline of displaying recording target frames and setting a recording mode in the first embodiment.
Figure 4B:
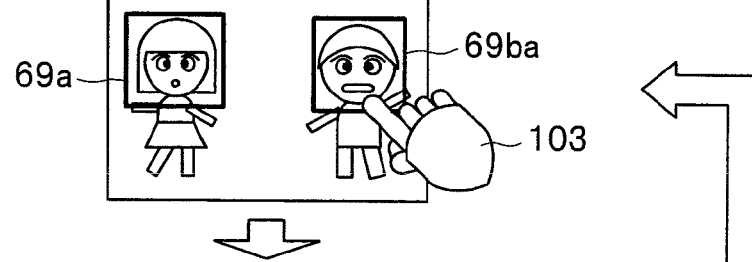
Figure 4C:
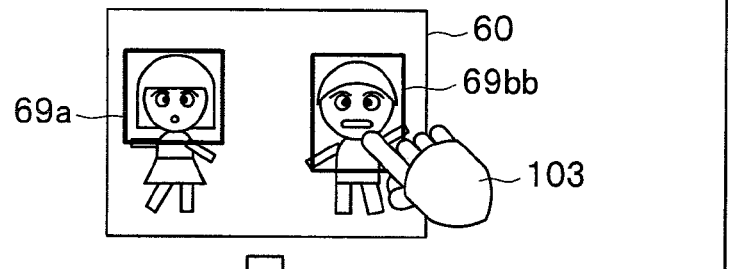
Figure 4D:
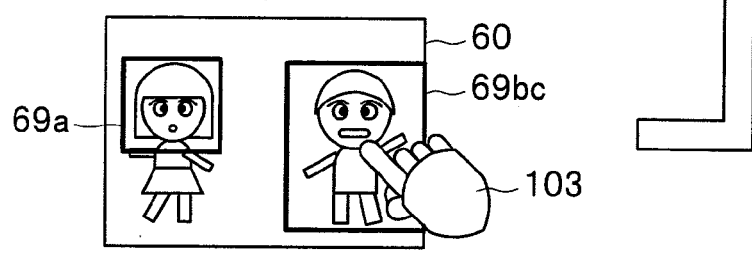

FIG. 4A shows a state in which the cameraman is performing a touch operation on the face detection frame 67b for the other object 102 between the objects 101 and 102 in the screen of the display section 60 with a finger 103. At this time, when one touch operation is performed to the face detection frame 67b, the object corresponding to the face detection frame 67b is determined as the second object 102, and a recording target frame 69ba surrounding a predetermined area with a face area of the second object 102 as a center is displayed. The screen after this operation is as shown in FIG. 4B. At this time, the face close-up mode is set as a recording mode. Three modes are prepared as recording modes as described above, and the three modes are sequentially switched in accordance with a touch operation. By performing a touch operation for a predetermined time period or longer (a so-called long press operation) when a recording target frame indicating a desired recording mode among recording target frames corresponding to desired recording modes (in FIGS. 4A to 4E, three kinds of recording target frames 69ba, 69bb and 69bc) is displayed, the recording mode is set. In FIG. 4B, the recording target frame 69ba corresponding to the face close-up mode is displayed. When a long press operation is performed here, the face close-up mode is set. When a normal touch operation is performed in the state of FIG. 4B, the display in FIG. 4B is switched to display in FIG. 4C, and the recording target frame 69bb corresponding to the bust close-up mode is displayed. When a long press operation is performed here, the bust close-up mode is set. When a normal touch operation is performed in the state of FIG. 4C, the display in FIG. 4C is switched to display in FIG. 4D, and the recording target frame 69bc corresponding to the whole-body mode is displayed. When a long press operation is performed here, the whole-body mode is set. When a normal touch operation is performed in the state of FIG. 4D, the display is switched to the display in FIG. 4B again.

Figure 4E:
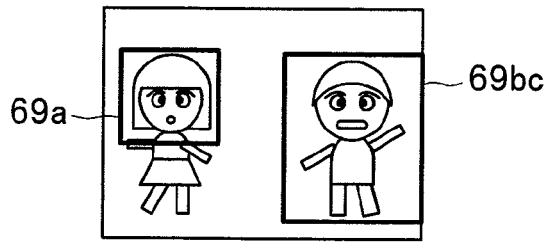

As described above, a recording mode is set by a long press operation, and a recording target frame corresponding to the set recording mode is displayed. In FIG. 4E, the face close-up mode is set for the first object 101, and the recording target frame 69a corresponding thereto is displayed. The whole-body mode is set for the second object 102, and the recording target frame 69bc corresponding thereto is displayed.

The operation described with the use of FIGS. 4A to 4E corresponds to steps S1 to S8 in FIG. 3. First, at step S1 in FIG. 3, the control section 66 monitors a signal from the touch screen included in the operation section 65 as well as following the objects 101 and 102 corresponding to the displayed face detection frames 67a and 67b, respectively. Then, when detecting a touch operation by the cameraman, the control section 66 judges whether or not there is a face at the touched position by the touch operation, that is, whether or not the touched position is within any of the areas of the face detection frames 67a and 67b.

If there is a face at the touched position, that is, if the touched position is within any of the areas of the face detection frames 67a and 67b, the control section 66 proceeds to step S4, and a face detection frame corresponding to the touched position is set as a reference position. After that, at step S3, the recording target frame 69a or 69b is displayed on the basis of the reference position set at step S4. After that, the control section 66 proceeds to step S5.

On the other hand, if the touched position is not within the face detection frame 67a or 67b at step S1, the control section 66 proceeds to step S2, and the position where the touch operation has been performed is set as a reference position at step S2. After that, at step S3, the recording target frame 69a or 69b is displayed on the basis of the reference position set at step S2. After that, the control section 66 proceeds to step S5.

At step S5, the control section 66 judges a signal based on the touch operation performed immediately before step S1. That is, if the detected touch operation is a long press operation of a predetermined time period or longer, the control section 66 proceeds to step S7. If the touch operation is a normal touch operation, the control section 66 proceeds to step S6.

At step S6, the control section 66 changes the size of the recording target frame. That is, the control section 66 causes a recording target frame different from the currently displayed recording target frame to be displayed. In other words, the control section 66 changes the recording mode. After that, the control section 66 returns to step S5, and a similar process is repeated until a long press operation is performed.

On the other hand, at step S7, the control section 66 decides the sizes of the recording target frame, that is, sets a recording mode corresponding to the currently displayed recording target frame. After that, the control section 66 proceeds to step S8.

Next, at step S8, the control section 66 monitors a signal from the operation section 65 and determines whether to perform further selection of a recording target or execute recording operation. If a recording target selection operation is performed, a selection operation signal from the touch screen is detected. In this case, the control section 66 returns to step S1, and a similar subsequent process is repeated. If a recording operation is performed, a recording operation signal from the release button or the touch screen is detected. In this case, the control section 66 proceeds to the next step S9.

At step S9, the control section 66 drives an image pickup section including the image pickup device 52 to start acquisition of motion picture data, that is, motion picture recording.

Figure 5A:
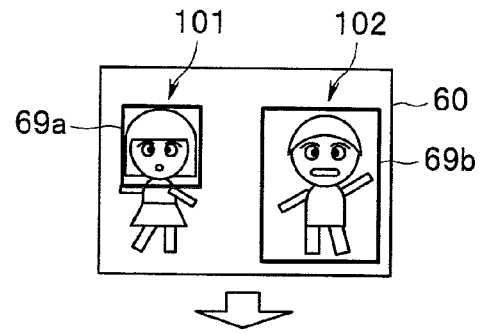
FIGS. 5A to 5F are diagrams corresponding to the process of FIG. 3 and showing change of recording target frames at the time of recording a motion picture.
Figure 5B:
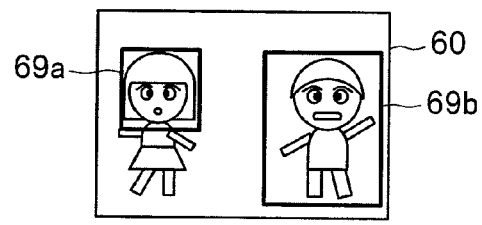
Figure 5C:
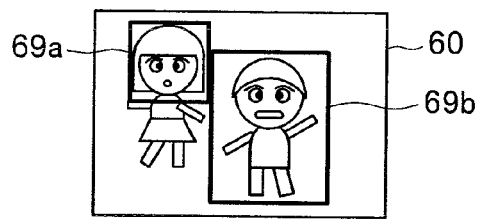
Figure 5D:
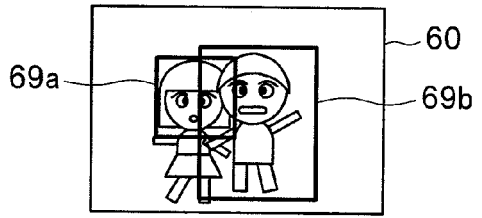

On the screen of the display section 60 at this time, a display shown in FIG. 5A is shown. The face close-up mode is set for the first object 101 in FIG. 5A, and a motion picture 60a shown in FIG. 6A is recorded. The whole-body mode is set for the second object 102 in FIG. 5A, and a motion picture 60b shown in FIG. 7A is recorded. In this way, different motion picture recordings in which the multiple objects selected as recording targets in advance are main objects, respectively, are executed at the same time. In addition, a motion picture of a whole image shown in FIG. 5A may be recorded at the same time.

When the motion picture recordings in the states of FIGS. 5A, 6A and 7A are continued, the two objects 101 and 102 move in a direction of coming near to each other in the screen in FIG. 5A. Then, the screen in FIG. 5A changes into the screen in FIG. 5B, into the screen in FIG. 5C and then into the screen in FIG. 5D, and consequently changes into the screen shown in FIG. 5E. At this time, as for the motion picture in which the first object 101 is a main object, a motion picture shown in FIGS. 6B, 6C, 6D and 6E in that order is recorded. That is, the motion picture by the face close-up mode is recorded in FIGS. 6A to 6D. In FIG. 6D among the figures, a state is recorded in which the second object 102 comes into the screen from the right end of the screen. In FIG. 6E, the face close-up mode based on the recording target frame 69a set so far is changed to a composite recording mode based on the composite recording target frame 69c.

Figure 7D:
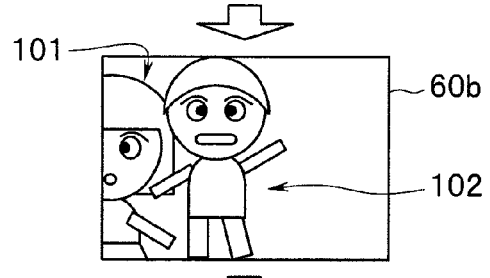
Figure 7E:
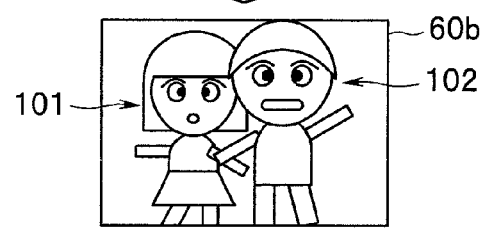
Figure 7F:
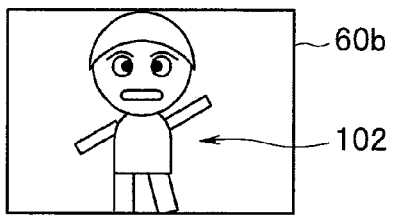

Similarly, as for the motion picture in which the second object 102 is a main object, a motion picture shown in FIGS. 7B, 7C, 7D and 7E in that order is recorded. In FIG. 7D, among the figures, a state is recorded in which the first object 101 comes into the screen from the left end of the screen. In FIG. 7E, the whole-body mode based on the recording target frame 69b set so far is changed to the composite recording mode based on the composite recording target frame 69c.

Figure 5E:
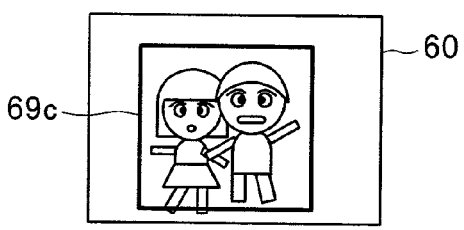

As described above, when the two recording target objects 101 and 102 come near to each other in the screen of the display section 60, the recording target frames 69a and 69b are changed into the composite recording target frame 69c shown in FIG. 5E. Then, motion pictures based on the composite recording target frame 69c, that is, the motion pictures based on the composite recording mode, shown in FIGS. 6E and 7E, are continuously recorded.

Figure 5F:
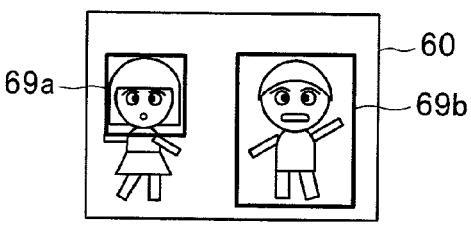

If the two objects 101 and 102 move in a direction of getting away from each other in the screen when the motion picture recordings are further continued in the above state, the screen changes into the screen shown in FIG. 5F after a while. At this time, the composite recording target frame 69c in FIG. 5E returns to the original recording target frames 69a and 69b, and the recording modes of motion pictures to be recorded also return to the recording modes based on the recording target frames 69a and 69b, respectively.

The flow of the above will be described by steps S9 to S26 in FIG. 3. First, at step S9 in FIG. 3, the control section 66 starts motion picture recording.

Then, at step S10, the control section 66 drives the image pickup section including the image pickup device 52 to acquire digital image data corresponding to one frame related to motion picture data. Since a prior-art technique used in a typical camcorder is applied to acquisition of motion picture data, detailed description thereof will be omitted.

Next, at step S11, the control section 66 causes the two recording target frames by the face detection section 67 to follow movements of the two objects 101 and 102, updates the positions of the two recording target frames in the screen of the display section 60, and then displays the two recording target frames.

Next, at step S12, the control section 66 judges whether or not change has occurred in relative positions of the two recording target frames by the face detection section 67 in the screen of the display section 60. If the relative positions have not changed, the control section 66 proceeds to step S23. If the relative positions have changed, and the change is such that two objects 101 and 102 have moved in a direction of getting away from each other, the control section 66 proceeds to step S13. If the relative positions have changed, and the change is such that the two objects 101 and 102 have moved in a direction of coming near to each other, the control section 66 proceeds to step S18.

If the relative positions have not changed at step S12, and the control section 66 proceeds to step S23, the control section 66 sets a frame control flag to control=0 at step S23. After that, the control section 66 proceeds to step S24.

If the change in the relative positions is change in the direction of the two getting away from each other at step S12, and the control section 66 proceeds to step S13, the control section 66 judges whether the recording target frames are being changed or not and sets the frame control flag to control=1 at step S13. If the recording target frames are being changed, the control section 66 proceeds to step S15. If the recording target frames are not being changed, the control section 66 proceeds to step S14.

Next, at step S14, the control section 66 starts to change the recording target frames (the frame control flag control=1 is kept). After that, the control section 66 proceeds to step S15.

At step S15, the control section 66 controls the recording target frame display section 79, the recording area setting section 68 and the like to gradually reduce the displayed recording target frames.

Next, at step S16, the control section 66 judges whether or not the change in the recording target frames has ended. If the change in the recording target frames has ended, the control section 66 proceeds to step S17 and sets the frame control flag to control=0 at step S17. Then, the control section 66 proceeds to step S24. If the change in the recording target frames has not ended at step S16, the control section 66 proceeds to step S24.

On the other hand, if the change in the relative positions is change in the direction of the two coming near to each other at step S12, and the control section 66 proceeds to step S18, the control section 66 judges whether the recording target frames are being changed or not and sets the frame control flag to control=1 at step S18. If the recording target frames are being changed, the control section 66 proceeds to step S20. If the recording target frames are not being changed, the control section 66 proceeds to step S19.

Next, at step S19, the control section 66 starts to change the recording target frames (the frame control flag control=1 is kept). After that, the control section 66 proceeds to step S20.

At step S20, the control section 66 controls the recording target frame display section 79, the recording area setting section 68 and the like to gradually enlarge the displayed recording target frames.

Next, at step S21, the control section 66 judges whether or not the change in the recording target frames has ended. If control of the change in the recording target frames has ended, the control section 66 proceeds to step S22 and sets the frame control flag to control=0 at step S22. Then, the control section 66 proceeds to step S24. If the change in the recording target frames has not ended at step S21, the control section 66 proceeds to step S24.

At step S24, to digital image data corresponding to the two recording target frames corresponding to one frame, which is temporarily stored in the SDRAM 63, the control section 66 causes additional information about the respective recording target frames to be recorded. After that, the control section 66 proceeds to step S25.

At step S25, the control section 66 judges whether or not processing of a last frame has been completed. If the processing of the last frame has been completed, the control section 66 proceeds to step S26. If the processing of the last frame has not been completed, the control section 66 returns to step S10 and repeats the subsequent process.

At step S26, the control section 66 controls the SDRAM 63, the memory IF 61 and the recording medium 62 to add association information and various types of necessary additional information, such as tags for synchronous reproduction, to multiple motion picture files being generated and then performs file close.

The above association information is information which associates original whole image data recorded simultaneously and multiple motion picture data with multiple objects in the whole image data as main objects, respectively, with one another. To have the association information is very convenient at the time of handling the multiple independent motion picture data files. For example, if a multi-window display or multi-display reproduction environment is configured at the time of performing motion picture reproduction, multiple motion pictures can be synchronously reproduced at the same time, and, therefore, it is possible to perform motion picture reproduction full of being-on-the-spot feeling or variation.

Next, a mechanism of the recording target frames 69a and 69b and the composite recording target frame 69c being changed when the two objects 101 and 102 come near to each other and get away from each other in the screen will be described with the use of FIGS. 8 and 9. FIG. 8 shows coordinates of an image displayed on the display section of the camcorder 1, the coordinates being are estimated on the screen.

In FIG. 8, a coordinate system is assumed in which a point at the lower left corner of the screen (corresponding to a whole image acquired by the image pickup device 52) displayed on the display section 60 is an origin (0, 0), and a horizontal axis and a vertical axis are an X axis and a Y axis, respectively.

The two objects 101 and 102 are displayed in the screen of the display section 60, and the recording target frames 69a and 69b are set for the objects 101 and 102, respectively. As coordinates for each of the recording target frames 69a and 69b, the following are specified:

coordinates (AX1, AY1) at the lower left of the recording target frame 69a corresponding to the first object 101;

coordinates (AX2, AY1) at the lower right of the recording target frame 69a corresponding to the first object 101;

coordinates (BX1, BY1) at the lower left of the recording target frame 69b corresponding to the second object 102;

coordinates (BX2, BY1) at the lower right of the recording target frame 69b corresponding to the second object 102; and coordinates (BX2, BY2) at the upper right of the recording target frame 69b corresponding to the second object 102.

FIG. 9 shows "overlap-between-recording-target-frames judgment" in which overlapping between the two recording target frames 69a and 69b is judged with the use of the coordinates of the recording target frames specified as described above when the two objects 101 and 102 come near to each other in the screen. This process is continuously executed during motion picture recording. The "overlap-between-recording-target-frames judgment" is performed in cooperation among the face detection section 67, the recording target frame display section 79, the recording area setting section 68 and the like under the control of the control section 66.

First, at step S31 in FIG. 9, it is judged whether "AX1<BX1" is satisfied or not for the points AX1 and BX1 on the X axis of the coordinate system in the screen. If "AX1<BX1" is satisfied, the control section 66 proceeds to step S32.

At step S32, it is judged whether "AX2<BX1" is satisfied or not. If "AX2<BX1" is not satisfied, that is, if "AX2>=BX1" is satisfied, the control section 66 proceeds to step S38. Then, at step S38, it is judged that there is overlapping between the recording target frames, and the series of processes ends.

On the other hand, if "AX1<BX1" is not satisfied at step S31, that is, if "AX1>=BX1" is satisfied, the control section 66 proceeds to step S33.

At step S33, it is judged whether "BX2<AX1" is satisfied or not. If "BX2<AX1" is not satisfied, that is, if "BX2>=AX1" is satisfied, the control section 66 proceeds to step S38. Then, at step S38, it is judged that there is overlapping between the recording target frames, and the series of processes ends.

On the other hand, if "AX2<BX1" is satisfied at step S32 and if "BX2<AX1" is satisfied at step S33, the control section 66 proceeds to step S34 in either of the cases.

At step S34, it is judged whether "AY1<BY1" is satisfied or not. If "AY1<BY1" is satisfied, the control section 66 proceeds to step S35.

At step S35, it is judged whether "AY2<BY1" is satisfied or not. If "AY2<BY1" is not satisfied, that is, if "AY2>=BY1" is satisfied, the control section 66 proceeds to step S38. Then, at step S38, it is judged that there is overlapping between the recording target frames, and the series of processes ends.

On the other hand, if "AY1<BY1" is not satisfied, that is, if "AY1>=BY1" is satisfied at step S34, the control section 66 proceeds to step S36.

At step S36, it is judged whether "BY2<AY1" is satisfied or not. If "BY2<AY1" is not satisfied, that is, if "BY2>=AY1" is satisfied, the control section 66 proceeds to step S38. Then, at step S38, it is judged that there is overlapping between the recording target frames, and the series of processes ends.

On the other hand, if "AY2<BY1" is satisfied at step S35 and if "BY2<AY1" is satisfied at step S36, the control section 66 proceeds to step S37 in either of the cases. Then, at step S37, it is judged that there is not overlapping between the recording target frames, and the series of processes ends.

When it is judged that there is overlapping between the recording target frames 69a and 69b corresponding to the two objects 101 and 102 in the screen as described above, the composite recording target frame 69c covering both of the two recording target frame 69a and 69b is generated next, and the composite recording target frame 69c is displayed on the screen. The "composite recording target frame generation" in this case will be described below with the use of FIGS. 10 to 14.

Similarly to FIG. 8, FIGS. 10 and 11 show coordinates of an image displayed on the display section, which are estimated on the screen. In FIG. 10 also, a coordinate system is assumed in which a point at the lower left corner of the screen (corresponding to a whole image acquired by the image pickup device 52) of the display section 60 is an origin (0, 0), and a horizontal axis and a vertical axis are an X axis and a Y axis, respectively.

The two objects 101 and 102 are displayed on the screen of the display section 60 shown in FIG. 10, and the recording target frames 69a and 69b are set for the objects 101 and 102, respectively. Coordinates for each of the recording target frames 69a and 69b are specified similarly to FIG. 8. It is assumed that, by the "overlap-between-recording-target-frames judgment" described above (see FIG. 9), the two recording target frames 69a and 69b overlap with each other (see FIG. 10), on the basis of the coordinates.

In this case, if the sizes of the two recording target frames 69a and 69b are different from each other when the composite recording target frame 69c is generated, the composite recording target frame 69c is set in accordance with the size of a larger recording target frame (in the present embodiment, the recording target frame 69b). Thereby, as shown in FIG. 11, a composite recording target frame 69c having such an image-to-be-recorded area that the two objects 101 and 102 are included in one area like the composite recording target frame 69c displayed on the screen of the display section 60 is set. In FIG. 11, as coordinates for the composite recording target frame 69c, the following are specified:

coordinates (X1, Y1) at the lower left of the composite recording target frame 69c;

coordinates (X2, Y1) at the lower right of the composite recording target frame 69c;

coordinates (X1, Y2) at the upper left of the composite recording target frame 69c; and coordinates (X2, Y2) at the upper right of the composite recording target frame 69c.

FIGS. 12 to 15 show the "composite recording target frame generation". This process is performed in cooperation among the face detection section 67, the recording target frame display section 79, the recording area setting section 68 and the like under the control of the control section 66.

In FIG. 12, the coordinate X1 of the composite recording target frame is judged. At step S41 in FIG. 12, it is judged whether, for AX1 and BX1 in FIG. 10, "AX1<BX1" is satisfied or not. If "AX1<BX1" is satisfied, the control section 66 proceeds to step S42. Then, at step S42, "X1=AX1" is applied, and the series of processes ends.

On the other hand, if "AX1<BX1" is not satisfied, that is, if "AX1>=BX1" is satisfied at step S41 in FIG. 12, the control section 66 proceeds to step S43. Then, at step S43, "X1=BX1" is applied, and the series of processes ends.

In FIG. 13, the coordinate X2 of the composite recording target frame is judged. At step S44 in FIG. 13, it is judged whether, for AX2 and BX2 in FIG. 10, "AX2<BX2" is satisfied or not. If "AX2<BX2" is satisfied, the control section 66 proceeds to step S46. Then, at step S46, "X2=BX2" is applied, and the series of processes ends.

On the other hand, if "AX2<BX2" is not satisfied, that is, if "AX2>=BX2" is satisfied at step S44 in FIG. 13, the control section 66 proceeds to step S45. Then, at step S45, "X2=AX2" is applied, and the series of processes ends.

In FIG. 14, the coordinate Y1 of the composite recording target frame is judged. At step S47 in FIG. 14, it is judged whether, for AY1 and BY1 in FIG. 10, "AY1<BY1" is satisfied or not. If "AY1<BY1" is satisfied, the control section 66 proceeds to step S48. Then, at step S48, "Y1=AY1" is applied, and the series of processes ends.

On the other hand, if "AY1<BY1" is not satisfied, that is, if "AY1>=BY1" is satisfied at step S47 in FIG. 14, the control section 66 proceeds to step S49. Then, at step S49, "Y1=BY1" is applied, and the series of processes ends.

Figure 15:
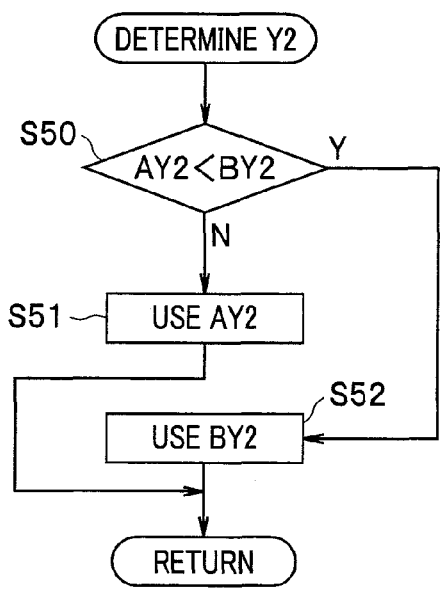
FIG. 15 is a flowchart showing judgment of Y2 of the composite recording target frame of the first embodiment.

In FIG. 15, the coordinate Y2 of the composite recording target frame is judged. At step S50 in FIG. 15, it is judged whether, for AY2 and BY2 in FIG. 10, "AY2<BY2" is satisfied or not. If "AY2<BY2" is satisfied, the control section 66 proceeds to step S52. Then, at step S52, "Y2=BY2" is applied, and the series of processes ends.

On the other hand, if "AY2<BY2" is not satisfied, that is, if "AY2>=BY2" is satisfied at step S50 in FIG. 15, the control section 66 proceeds to step S51. Then, at step S51, "Y2=AY2" is applied, and the series of processes ends.

As described above, the composite recording target frame 69c is set and displayed at a set position on the screen of the display section 60. In the present embodiment, by gradually enlarging the recording target frame 69a with a smaller size so that the size of the recording target frame 69a is close to the size of the recording target frame 69b with a larger size and, after that, causing both recording target frames to overlap with each other, the composite recording target frame 69c is displayed in the end. FIGS. 16A to 16D temporally show the states at that time.

Figure 16A:
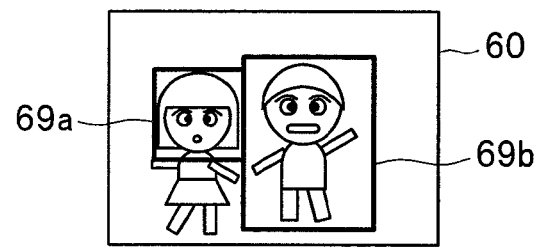
FIGS. 16A to 16D are conceptual diagrams showing a state of two recording target frames on the screen of the first embodiment being changed into the composite recording target frame.

In FIG. 16A, the two objects 101 and 102 are displayed in the screen of the display section 60, and the recording target frames 69a and 69b with different sizes corresponding to the objects 101 and 102, respectively, are displayed. The two recording target frames 69a and 69b partially overlap with each other.

Figure 16B:
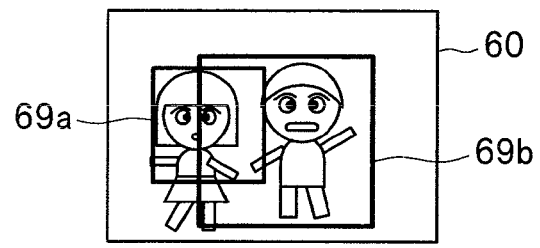
Figure 16C:
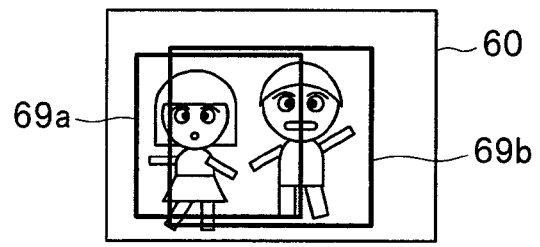
Figure 16D:
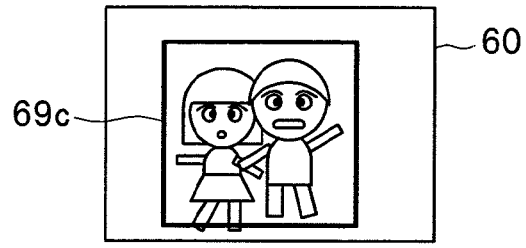

When the state in FIG. 16A shifts to the state of FIG. 16B and then the state in FIG. 16C, the two objects 101 and 102 move in a direction of coming near to each other, and the two recording target frames 69a and 69b gradually overlap with each other. At the same time, the recording target frame 69a with a smaller size is gradually enlarged so as to be adjusted to the recording target frame 69b with a larger size. Then, one composite recording target frame 69c shown in FIG. 16D is displayed in the end.

If the two objects 101 and 102 move in a direction of getting away from each other, the composite recording target frame 69c is changed into the respective corresponding recording target frames 69a and 69b again. A procedure for changing the sizes of the recording target frames in this case is opposite to the above procedure for changing the size for enlargement, and the process is almost the same.

Changing of the recording target frames 69a and 69b corresponding to the objects 101 and 102 into the composite recording target frame 69c is performed not as instantaneous switching but as gradual change.

FIGS. 17 and 18 are diagrams in which the state at the time of changing the sizes of the recording target frames are graphed. FIG. 17 is a graph showing transition of points on the X axis of the recording target frames at the time of enlargement and reduction. FIG. 18 is a graph showing transition of points on the Y axis of the recording target frames at the time of enlargement and reduction. In FIGS. 17 and 18, the horizontal axis indicates time, and the vertical axis indicates coordinates. By performing change of the recording target frames shown in FIGS. 17 and 18, a motion picture with a less unnatural feeling can be obtained.

As described above, when the objects 101 and 102 in the screen come near to each other, motion picture recording is performed for a recording area corresponding to the composite recording target frame 69c into which the recording target frames 69a and 69b corresponding to the respective objects have been changed so that the two objects 101 and 102 are simultaneously included.

Therefore, at the time of performing change between the recording target frames 69a and 69b and the composite recording target frame 69c, the image-to-be-recorded area is changed for a recording mode being executed. More specifically, the motion picture in which the first object 101 is recorded in the face close-up mode is zoomed down to be adjusted to the composite recording target frame 69c. If sudden zooming is performed during recording of the motion picture, the motion picture seems unnatural. Therefore, it is desirable to perform zooming gradually. Therefore, similarly to the case of, when the recording target frames 69a and 69b are changed into the composite recording target frame 69c, gradually enlarging or reducing the recording target frames, zooming is gradually performed for the motion picture being recorded also. The zooming performed here is not optical zooming performed by driving the recording optical system 41 but so-called electronic zooming which is performed on the basis of whole-image data acquired by the image pickup device 52.

As described above, according to the present embodiment, when motion picture recording is performed with multiple objects in the screen as recording targets, it is possible to record separate motion pictures with the multiple objects as main objects, respectively, at the same time. When the multiple objects come near to one another or get away from one another in the screen, the motion pictures are recorded without the motion pictures being unnatural while continuity of motion picture recording corresponding to motion of each object is kept. That is, when two objects come near to each other in the screen and enter the same recording target frame, motion picture recording with the two objects as main objects is performed. When the two objects get away from each other, separate motion picture recordings with the respective objects as main objects are performed.

Therefore, by the cameraman only catching multiple objects to be recording targets in the screen of the display section 60, multiple motion pictures with the multiple respective objects in the screen as main objects are recorded. In addition, a whole image corresponding to the screen of the display section 60 can be also recorded.

For each process described in the present embodiment, the procedure for the process can be allowed as far as the change is not against the nature of the process. Therefore, as for the processes described above, it is possible to change the order of the respective processes, execute multiple processes at the same time, and, each time a series of processes is executed, change the order of the respective processes.

Second Embodiment

Next, a second embodiment according to the present invention will be described. The present embodiment is an example of applying the present invention to a simple object monitoring apparatus in which a display function and a recording function are omitted.

As shown in FIG. 19, the configuration of an object monitoring apparatus 100 is almost the same as the camcorder 1 of the first embodiment described above, and the same units are given the same reference numerals.

Since an object identification section 110 in FIG. 19 is a unit which identifies an object using a technique for existing monitoring apparatuses, detailed description of a function of identifying an object will be omitted.

When the object monitoring apparatus 100 starts operation and the object identification section 110 identifies one or multiple objects, the object identification section 110 starts to follow the objects.

When the object identification section 110 identifies the multiple objects, each of the objects is separately identified or the multiple objects are identified collectively.

Third Embodiment

Next, a third embodiment according to the present invention will be described. Though the present embodiment has the same configuration as the second embodiment, operation is different.

When the object monitoring apparatus 100 starts operation and the object identification section 110 identifies one or multiple objects, the object identification section 110 starts to follow the objects.

When identifying the multiple objects, the object identification section 110 follows each of the objects and, simultaneously, detects the position of each object.

The object identification section 110 identifies each of the objects separately or identifies the multiple objects collectively on the basis of the positions of the respective objects.

In this case, the object identification section 110 may identify each of objects if distance among the objects is longer than a predetermined distance and identify the multiple objects collectively if the distance is shorter than the predetermined distance.

Variations of the Second and Third Embodiments

The object monitoring apparatus 100 may further include an image output section so that the image output section outputs an image which includes objects identified by the object identification section 110.

The object monitoring apparatus 100 may further include an image display section so that the image display section displays the image which includes the objects identified by the object identification section 110.

The object monitoring apparatus 100 may further include an image recording section so that the image recording section records the image which includes the objects identified by the object identification section 110.

The object monitoring apparatus 100 may further include an auxiliary image output section so that the auxiliary image output section generates auxiliary images showing at least partial parts of the objects identified by the object identification section 110, and outputs and records the auxiliary images. Furthermore, the positions of the respective objects described above may be determined on the basis of the auxiliary images. The auxiliary images may be multiple auxiliary images showing the multiple objects identified by the object identification section 110, respectively, or one auxiliary image showing multiple objects identified collectively is also possible.

The present invention is not limited to the embodiments described above, and it is, of course, possible to perform various modifications or applications within a range not departing from the spirit of the invention. Furthermore, the present embodiments include inventions at various stages, and various inventions can be extracted by appropriate combination among the disclosed multiple components. For example, if the problem to be solved by the invention can be solved and the advantages of the invention can be obtained even after some components are deleted from all of the components shown in the embodiments, the configuration from which the components have been deleted can be extracted as an invention. The present invention is limited only by the accompanying claims and is not restricted by particular embodiments.

The present invention is not limited to a motion picture recording apparatus which is an electronic apparatus specialized in a recording function, such as a camcorder and a digital camcorder, and is also applicable to electronic apparatuses provided with a motion picture recording function in other forms, for example, various kinds of electronic apparatuses provided with the motion picture recording function, such as a mobile phone, a smartphone, a recording apparatus, an electronic notebook, a personal computer, a game machine, a TV, a clock and a navigation apparatus using a GPS (global positioning system).

What is claimed is:

1. An object recognition apparatus comprising:
an image output section acquiring multiple object images and outputting an image;
a detection section detecting the multiple object images in the image;
a first identification section identifying the detected multiple object images;
a second identification section identifying the detected multiple object images collectively; and
a position detection section detecting positions of the detected multiple object images,
wherein at least one of the first identification section and the second identification section operates according to the detected positions of the multiple object images,
wherein the first identification section operates if distance among the detected positions of the multiple object images is longer than a predetermined distance, and
wherein the second identification section operates if distance among the detected positions of the multiple object images is shorter than the predetermined distance.

2. The object recognition apparatus according to claim 1, wherein
the first identification section outputs multiple first images, each of which includes each of the identified multiple object images; and
the second identification section outputs one second image which includes all of the identified multiple objects.

3. The object recognition apparatus according to claim 2, wherein
the first identification section outputs multiple first auxiliary images showing at least partial parts of parts which the first identification section outputs as the multiple first images, from the image outputted by the image output section; and the second identification section outputs one second auxiliary image showing at least a partial part of a part which the second identification section outputs as the one second image, from the image outputted by the image output section.

4. The object recognition apparatus according to claim 1, further comprising a display section and a recording section, wherein
the display section displays at least one of output of the first identification section and output of the second identification section, and the recording section records contents of display on the display section.

5. The object recognition apparatus according to claim 2, further comprising a display section and a recording section, wherein
the display section displays at least either of the multiple first images outputted by the first identification section and the one second image outputted by the second identification section, and the recording section records contents of display on the display section.

6. The object recognition apparatus according to claim 3, further comprising a display section and a recording section, wherein
the display section displays at least either of the multiple first auxiliary images outputted by the first identification section and the one second auxiliary image outputted by the second identification section, and the recording section records contents of display on the display section.

7. The object recognition apparatus according to claim 3, wherein
the position detection section detects the positions of the multiple object images on the basis of positions of the multiple first auxiliary images.

8. An object recognition method comprising steps of:
acquiring multiple object images and outputting an image;
detecting the multiple object images in the image;
identifying the detected multiple object images;
identifying the detected multiple object images collectively;
detecting positions of the detected multiple object images, wherein at least one of identification of the detected multiple object images and collective identification of the detected multiple object images operates according to the detected positions of the multiple object images;
identifying the detected multiple object images if distance among the detected positions of the multiple object images is longer than a predetermined distance; and
identifying the detected multiple object images collectively if distance among the detected positions of the multiple object images is shorter than the predetermined distance.

9. The object recognition method according to claim 8, comprising steps of:
outputting multiple first images, each of which includes each of the identified multiple object images; and
outputting one second image which includes all of the identified multiple objects.

10. The object recognition method according to claim 9, comprising steps of:
outputting multiple first auxiliary images showing at least partial parts of parts outputted as the multiple first images from the image; and
outputting one second auxiliary image showing at least a partial part of a part outputted as the one second image from the image.

11. The object recognition method according to claim 8, comprising a step of displaying at least one of output of a result of identifying the detected multiple object images and output of a result of identifying the detected multiple object images collectively, and recording contents of the display.

12. The object recognition method according to claim 9, comprising a step of displaying at least either of the multiple first images and the one second image, and recording contents of the display.

13. The object recognition method according to claim 10, comprising a step of displaying at least either of the multiple first auxiliary images and the one second auxiliary image, and recording contents of the display.

14. The object recognition method according to claim 10, comprising a step of detecting the positions of the multiple object images on the basis of positions of the multiple first auxiliary images.

15. A non-transitory computer-readable recording medium in which an object recognition program is recorded, the object recognition program comprising steps of:
- acquiring multiple object images and outputting an image;
- detecting the multiple object images in the image;
- identifying the detected multiple object images;
- identifying the detected multiple object images collectively;
- outputting multiple first images, each of which includes each of the identified multiple object images;
- outputting one second image which includes all of the identified multiple objects;
- outputting multiple first auxiliary images showing at least partial parts of parts outputted as the multiple first images from the image;
- outputting one second auxiliary image showing at least a partial part of a part outputted as the one second image from the image;
- displaying at least one of output of a result of identifying the detected multiple object images and output of a result of identifying the detected multiple object images collectively, and recording contents of the display;
- displaying at least either of the multiple first auxiliary images and the one second auxiliary image, and recording contents of the display;
- detecting positions of the detected multiple object images, wherein at least one of identification of the detected multiple object images and collective identification of the detected multiple object images operates according to the detected positions of the multiple object images;
- identifying the detected multiple object images if distance among the detected positions of the multiple object images is longer than a predetermined distance;
- identifying the detected multiple object images collectively if distance among the detected positions of the multiple object images is shorter than the predetermined distance; and
- detecting the positions of the multiple object images on the basis of positions of the multiple first auxiliary images.

* * * * *